US010229325B2

(12) United States Patent
Povar et al.

(10) Patent No.: US 10,229,325 B2
(45) Date of Patent: Mar. 12, 2019

(54) MOTION BASED VIDEO SEARCHING SYSTEM USING A DEFINED MOVEMENT PATH FOR AN OBJECT

(71) Applicant: International Business Machines Corporation, Armonk, NY (US)

(72) Inventors: Victor Povar, Port Moody (CA); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 15/444,828

(22) Filed: Feb. 28, 2017

(65) Prior Publication Data

US 2018/0247131 A1 Aug. 30, 2018

(51) Int. Cl.
*G06K 9/00* (2006.01)
*G06T 7/20* (2017.01)
*G06F 17/30* (2006.01)
*G11B 27/10* (2006.01)
*G06F 3/0488* (2013.01)

(52) U.S. Cl.
CPC ..... *G06K 9/00758* (2013.01); *G06F 17/3079* (2013.01); *G06F 17/3084* (2013.01); *G06F 17/30811* (2013.01); *G06T 7/20* (2013.01); *G11B 27/10* (2013.01); *G06F 3/04883* (2013.01); *G06K 2209/03* (2013.01); *G06T 2207/10016* (2013.01); *G06T 2207/20092* (2013.01)

(58) Field of Classification Search
None
See application file for complete search history.

(56) References Cited

U.S. PATENT DOCUMENTS

| 6,748,158 | B1 | 6/2004 | Jasinschi et al. |
| 2008/0235621 | A1 | 9/2008 | Boillot |
| 2012/0197857 | A1 | 8/2012 | Huang et al. |
| 2013/0342671 | A1* | 12/2013 | Hummel ............. G06K 9/6202 348/77 |
| 2014/0205148 | A1 | 7/2014 | Hirano et al. |
| 2016/0103830 | A1* | 4/2016 | Cheong ................ G06F 3/0488 715/738 |

FOREIGN PATENT DOCUMENTS

EP 1237374 A1 9/2002

OTHER PUBLICATIONS

"Motion-Based Multiple Object Tracking", MathWorks Inc., accessed Jan. 31, 2017, 11 pages. http://www.mathworks.com/help/vision/examples/motion-based-multiple-object-tracking.html?request=&requestedDomain=in.mathworks.com.
Dragicevic et al., "Video Browsing by Direct Manipulation", CHI 2008 Proceedings—Improved Video Navigation and Capture, Apr. 5-10, 2008, pp. 237-246.

* cited by examiner

*Primary Examiner* — Idowu O Osifade
(74) *Attorney, Agent, or Firm* — Yee & Associates, P.C.; Jay Wahlquist

(57) ABSTRACT

A method, system, and computer program product for searching a video. The method comprises a computer system for displaying a video on a display system. The computer system receives user input to the video from a user input device while the video is displayed on the display system, wherein the user input describes a defined movement path for an object. The computer system searches the video for a video segment that includes a movement path for the object that is sufficiently similar to the defined movement path.

20 Claims, 6 Drawing Sheets

MOTION BASED VIDEO SEARCHING SYSTEM USING A DEFINED MOVEMENT PATH FOR AN OBJECT

BACKGROUND

1. Field

The disclosure relates generally to an improved computer system, and more specifically, to a method, apparatus, and computer program product for searching videos for objects moving along a defined path.

2. Description of the Related Art

A video is an electronic medium in which images are typically played at 24 or more images per second. Each one of these images is referred to as a video frame or just a frame. When the relative position of objects change from one frame to another frame, a user may view moving objects.

For example, the user may watch a football game. The football changes position during the game. As another example, the user may watch a video of a car race, in which cars move during the race shown in the video.

Software may be used to detect objects such as footballs and cars in images and frames in videos. The software may be used to identify frames in segments of the videos in which objects are present and indicate the presence of those objects.

These object detection features may be used to view the detected objects, or other such people, in addition to a football or race car. This feature may allow broadcasters to detect selected participants in a game or a particular car in a race. Further, this feature may allow the ability to detect a person in a store for marketing purposes.

SUMMARY

An embodiment of the present disclosure provides for a method, system and computer program product for searching a video. The method comprises a computer system for displaying the video on a display system. The computer system receives user input to the video from a user input device while the video is displayed on the display system, wherein the user input describes a defined movement path for an object. The computer system searches the video for a video segment that includes a movement path for the object that is sufficiently similar to the defined movement path. The system provides for a video processing system comprising a processor unit and a segment locator. The segment locator runs on the processor unit and displays a video on a display system. The segment locator receives a user input to the video from a user input device, while the video is displayed on the display system, wherein the user input describes a defined movement path for an object. The segment locator searches the video for a video segment that includes a movement path for the object that is sufficiently similar to the defined movement path and displays the video segment. The computer program product comprises a computer-readable storage media, a first program code, a second program code, a third program code, and a fourth program code, all stored on the computer-readable storage media. The first program code uses a computer system to display a video on a display system. The second program code receives user input to the video from a user input device while the video is displayed on the display system, wherein the user input describes a defined movement path for an object. The third program code searches the video for a video segment that includes a movement path for the object that is sufficiently similar to the defined movement path. The fourth program code displays the video segment.

DETAILED DESCRIPTION

Figure 1:
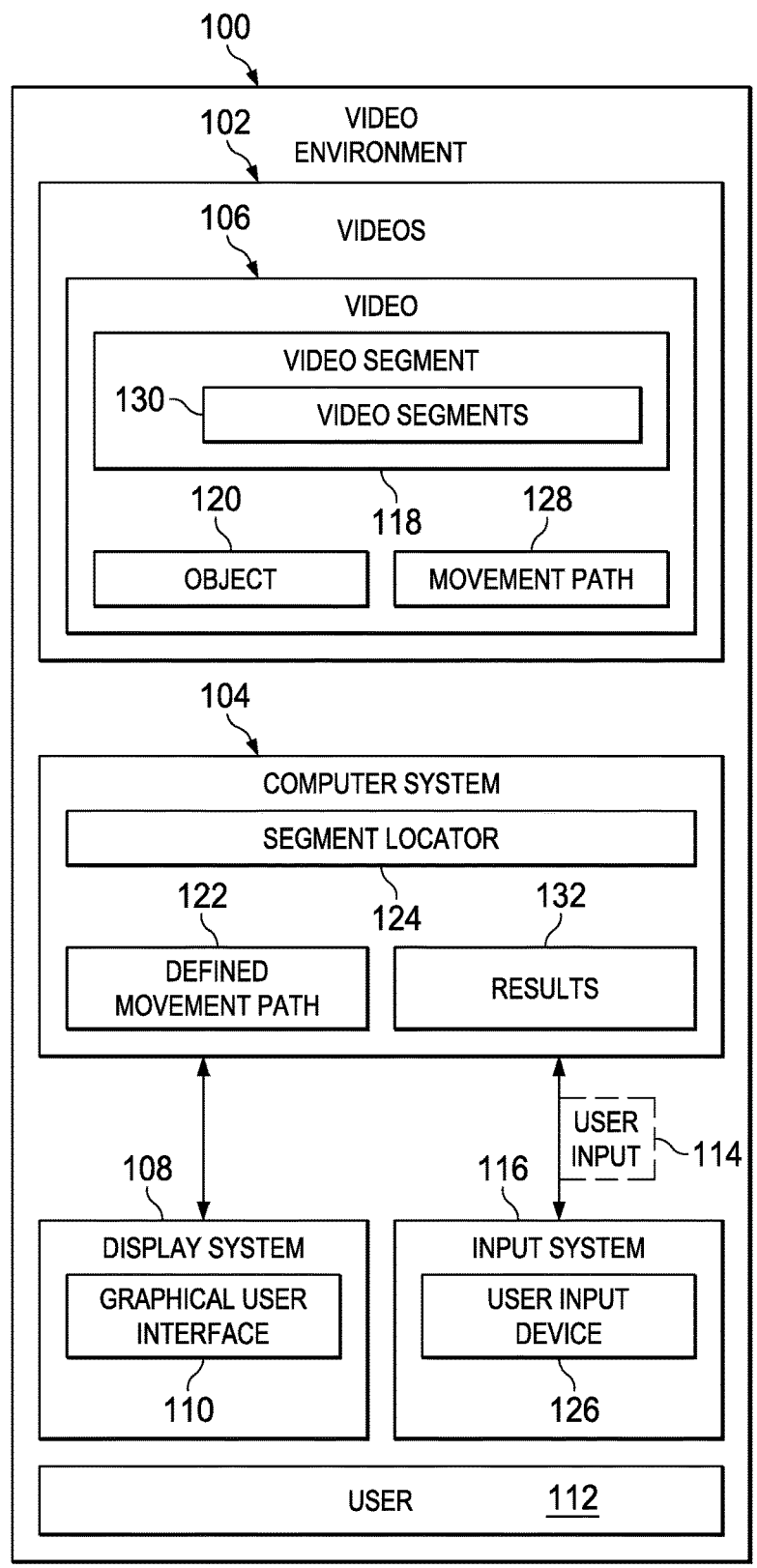
FIG. 1 is a block diagram of a video environment in accordance with an illustrative embodiment.

The present invention may be a system, a method, and/or a computer program product. The computer program product may include a computer-readable storage medium or media, having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing devices. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing devices. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. These computer program instructions may also be stored in a computer-readable medium that can direct a computer, other programmable data processing apparatus, or other devices to function in a particular manner, such that the instructions stored in the computer readable medium produce an article of manufacture including instructions which implement the function or act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions or acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or carry out combinations of special purpose hardware and computer instructions.

The illustrative embodiments also recognize and take into account that it would be desirable to locate an object that moves along a selected path. For example, a user may be viewing a video of a football game and desire to see a particular play. The user may define a movement path for a particular player or the football in which that play occurs. The illustrative embodiments recognize and take account that it would be desirable to find a video segment in which that movement path representative of the play of interest is present.

Thus, the illustrative embodiments provide a method, apparatus, and computer program product for searching a video. In the illustrative examples, the video may be searched to identify one or more segments in the video that includes a defined movement path for an object. For example, the computer system displays the video on a display system. The computer system receives a user input to the video from a user input device while the video is playing, wherein the user input describes a defined movement path for an object. The computer system searches the video for a video segment that includes a movement path for the object that is sufficiently similar to the defined movement path and displays the video segment.

With reference now to the figures and, in particular, with reference to FIG. 1, a block diagram of a video environment is depicted in accordance with an illustrative embodiment. Video environment 100 is an environment in which videos 102 are present. In this example, computer system 104 displays video 106 in videos 102 on display system 108.

Computer system 104 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable type of data processing system.

Display system 108 is a physical hardware system and includes one or more display devices on which graphical user interface 110 may be displayed. The display devices may include at least one of a light emitting diode (LED) display, a liquid crystal display (LCD), an organic light emitting diode (OLED) display, or some other suitable device on which graphical user interface 110 and video 106 can be displayed. User 112 is a person that may interact with graphical user interface 110 through user input 114 generated by input system 116 for computer system 104. Input system 116 is a physical hardware system and may include user input devices selected from at least one of a mouse, a keyboard, a trackball, a touchscreen, a stylus, a motion sensing input device, a cyber glove, or some other suitable type of input device.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

As depicted, user 112 views video 106 displayed on display system 108. User 112 desires to see video segment 118 in video 106 in which object 120 has defined movement path 122.

In this illustrative example, segment locator 124 is located in computer system 104. Segment locator 124 displays video 106 on display system 108. Segment locator 124 receives user input 114 to video 106 from user input device 126 in input system 116 while video 106 is displayed on display system 108. User input 114 describes defined movement path 122 for object 120. Segment locator 124 searches video 106 for video segment 118 that includes movement path 128 for the object that is sufficiently similar to defined movement path 122. Segment locator 124 displays video segment 118 on display system 108.

In one illustrative example, segment locator 124 may identify more than one segment in video 106. As a result, segment locator 124 displays results 132 with video segments 130 identified from searching video 106. Results 132 may be ranked on how closely the movement of object 120 in each of video segments 130 in results 132 matches movement path 128.

As depicted, user input device 126 generates user input 114, including defined movement path 122. In some illustrative examples, user input 114 may also select object 120. In this illustrative example, defined movement path 122 in user input 114 is defined using coordinates for dimensions consisting one of two dimensions and three dimensions. Also, user input 114 may be a gesture made to user input device 126 in the form of a touch screen in display system 108.

Segment locator 124 may be implemented in software, hardware, firmware, or a combination thereof. When software is used, the operations performed by segment locator 124 may be implemented in program code configured to run on hardware, such as a processor unit. When firmware is used, the operations performed by segment locator 124 may be implemented in program code and data and stored in persistent memory to run on a processor unit. When hardware is employed, the hardware may include circuits that operate to perform the operations in segment locator 124.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In one illustrative example, one or more technical solutions are present that overcome a technical problem with viewing objects that move in a particular way in a video. As a result, one or more technical solutions may provide a technical effect as to identifying one or more segments in a video in which a selected object has a movement path that corresponds closely enough to a desired movement path. One or more technical solutions receive a user input defining the desired movement path in which the user input is made to the video while the video is displayed on a display system.

As a result, computer system 104 operates as a special purpose computer system in which segment locator 124 in computer system 104 enables locating a segment of a video in which an object has a defined movement path as defined by a user. In particular, segment locator 124 transforms computer system 104 into a special purpose computer system as compared to currently available general computer systems that do not have segment locator 124.

Figure 2:
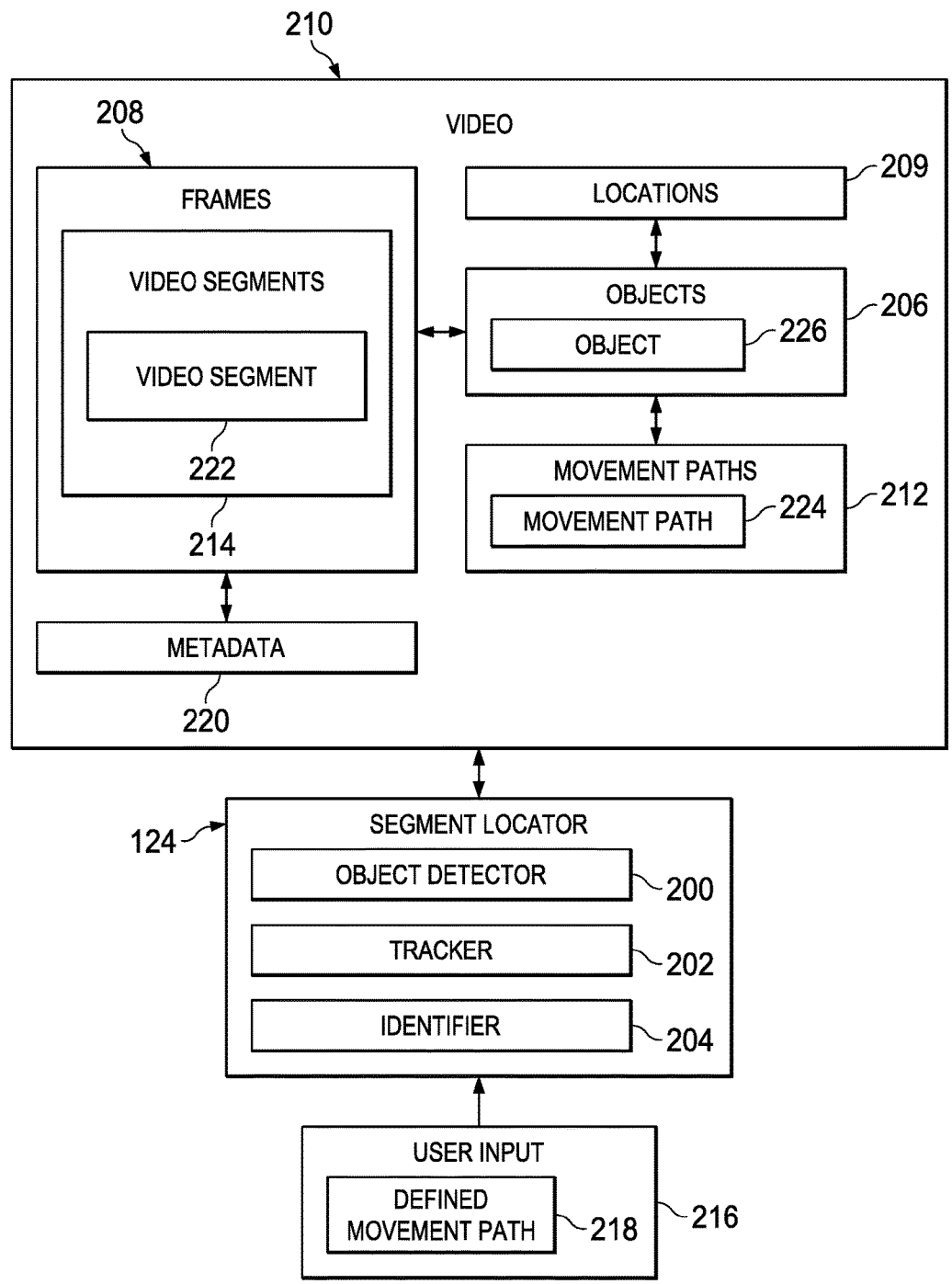
FIG. 2 is an illustration of a dataflow in identifying and searching for movement paths for objects in a video in accordance with an illustrative embodiment.

With reference next to FIG. 2, an illustration of a dataflow in identifying and searching for movement paths for objects in a video is depicted in accordance with an illustrative embodiment. An example of one implementation of segment locator 124 of FIG. 1 is depicted in the dataflow illustrated in FIG. 2.

As depicted, segment locator 124 includes a number of different components. In this illustrative example, segment locator 124 comprises object detector 200, tracker 202, and identifier 204.

Object detector 200 includes processes to identify objects 206 in frames 208 in video 210. Video 210 is an example of a video in videos 102 in FIG. 1. Tracker 202 identifies locations 209 of objects 206 in frames 208 of video 210. Locations 209 are used to identify movement paths 212.

As depicted, identifier 204 identifies one or more of video segments 214 of frames 208 that have defined movement path 218 or have movement paths in movement paths 212 that are sufficiently close to defined movement path 218. Identifier 204 receives user input 216 with defined movement path 218.

As depicted, during operation of segment locator 124, object detector 200 in segment locator 124 identifies objects 206 in frames 208 for video 210. Tracker 202 in segment locator 124 identifies movement paths 212 for objects 206 in frames 208. Tracker 202 stores movement paths 212 as metadata 220 in frames 208.

With movement paths 212 stored as metadata 220, identifier 204 in segment locator 124 searches video 106 of FIG. 1 for video segment 222 that includes movement path 224 for object 226 that is sufficiently similar to defined movement path 218. The search may be performed by segment locator 124 comparing defined movement path 218 to movement paths 212 in metadata 220 for movement path 224 in movement paths 212 that is that is sufficiently similar to defined movement path 218.

The illustrations in FIG. 1 and FIG. 2 are not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, as shown in FIG. 1, display system 108 and input system 116 may be located in one data processing system in computer system 104 while segment locator 124 may be located on another data processing system in computer system 104. Display system 108 and input system 116 may be located in a mobile phone or tablet computer. Segment locator 124 may be located on a server computer in communication with the mobile phone or tablet computer. In another illustrative example, all three of these components may be on the same data processing system.

Figure 3:
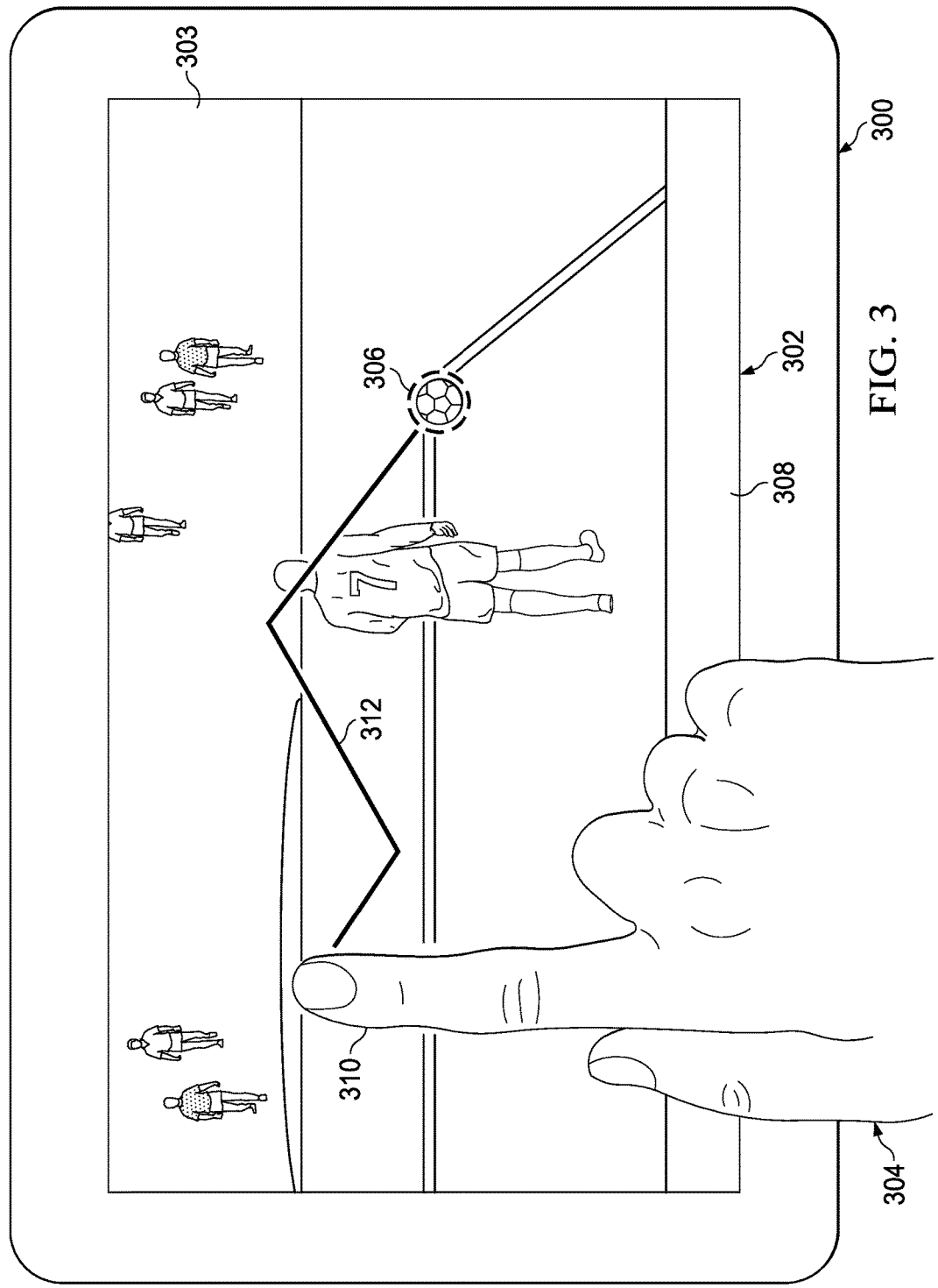
FIG. 3 is an illustration of a defined movement path in accordance with an illustrative embodiment.

With reference now to FIG. 3, an illustration of a defined movement path is depicted in accordance with an illustrative embodiment. In this illustrative example, device 300 is an example of a data processing system within computer system 104 as shown in FIG. 1. Device 300 is a tablet computer in this particular example. As depicted, video 302 is displayed on graphical user interface 303 on device 300. Graphical user interface 303 is an example of an implementation for graphical user interface 110 shown in block form in FIG. 1.

As depicted, user 304 has selected object 306 from user input to touchscreen 308. Additionally, user 304 inputs defined movement path 312 through user input in the form of a gesture onto touchscreen 308 for device 300. In this example, the gesture input is generated by user 304 moving finger 310 on touchscreen 308.

In this manner, user 304 may select selected object 306 and identify defined movement path 312 through user input in the form of a gesture. The results of the search using defined movement path 312 in video 302 may be displayed on touchscreen 308 of device 300.

With defined movement path 312, a segment locator may search the video for one or more segments in which the selected object has the same movement or movement that is similar enough to the movement in the defined movement path.

Figure 4:
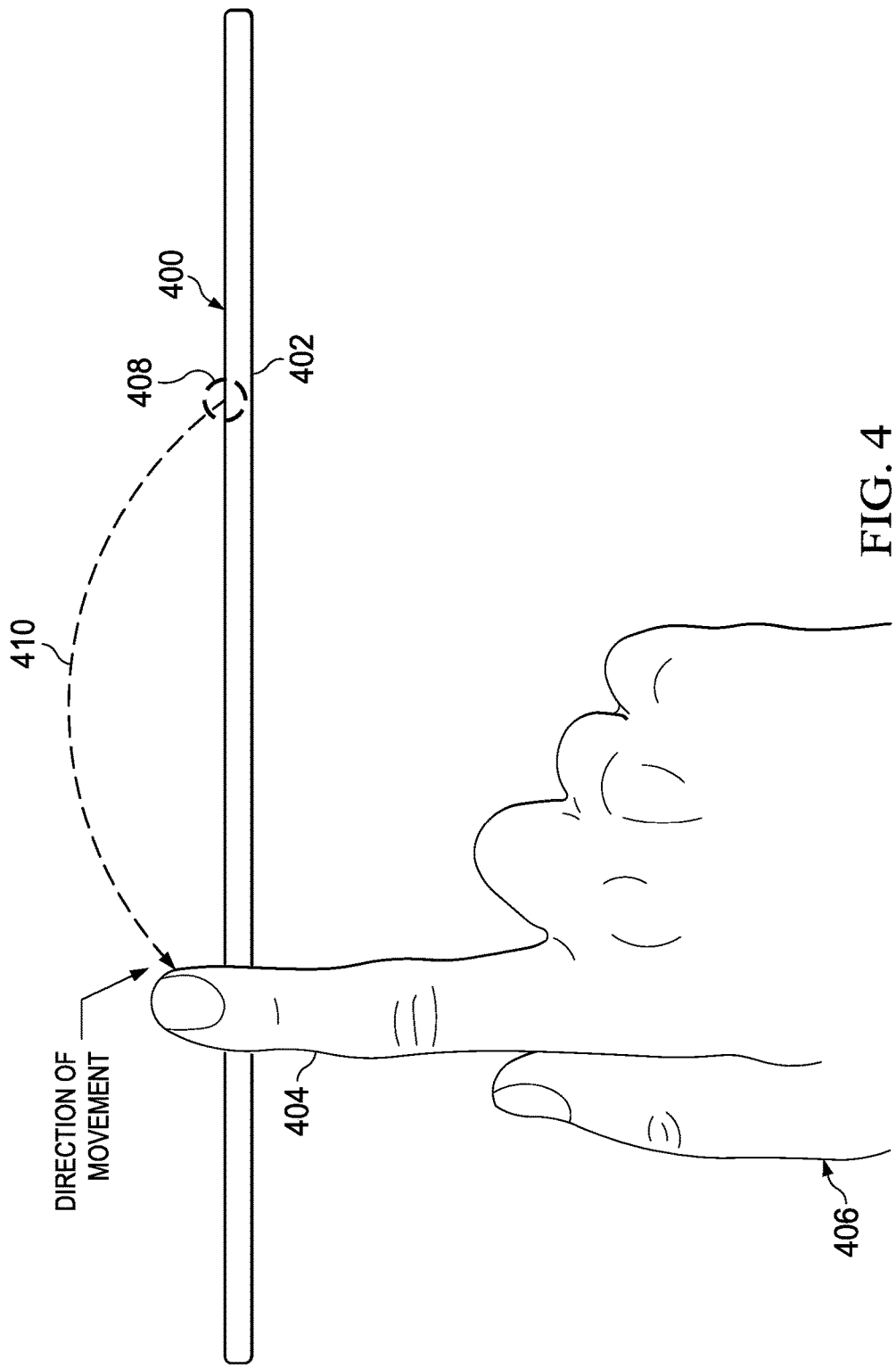
FIG. 4 is an illustration of a defined movement path in accordance with an illustrative embodiment.

Turning to FIG. 4, an illustration of a defined movement path is depicted in accordance with an illustrative embodiment. In this illustrative example, device 400 is shown and is an example of a data processing system in computer system 104 of FIG. 1.

In this illustrative example, motion sensing input device 402 is associated with device 400 and detects three-dimensional movements of finger 404 for user 406. As depicted, point 408 is a location of an object in a video, not seen in this view. Finger 404 moves along defined movement path 410 through the air relative to device 400.

In this manner, user 406 may define defined movement path 410 in three dimensions. In this example, the movement of the selected object at point 408 is one in which the selected object will fly in the air and land, as shown by defined movement path 410. Thus, defined movement path 410 may be used to search the video for one or more video segments in which the selected object has the same movement or a movement path similar to defined movement path 410.

Figure 5:
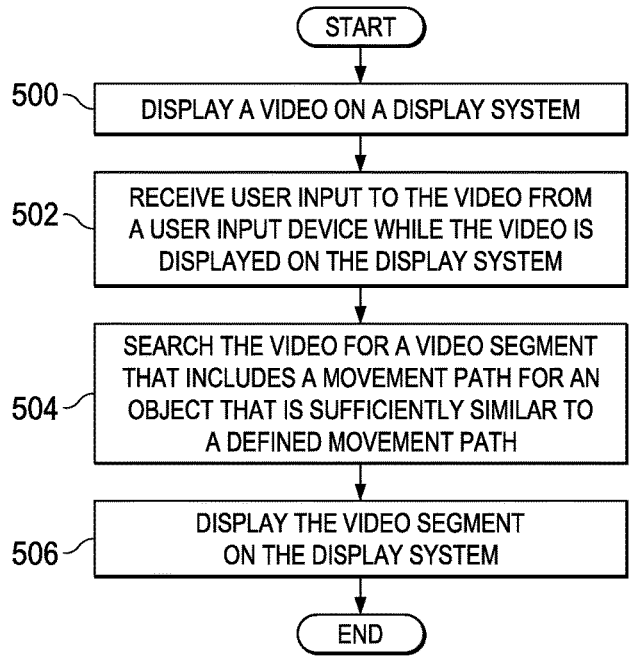
FIG. 5 is a flowchart of a process for searching a video in accordance with an illustrative embodiment.

Turning next to FIG. 5, a flowchart of a process for searching a video is depicted in accordance with an illustrative embodiment. The process illustrated in FIG. 5 may be implemented in at least one of software or hardware for segment locator 124 as shown in FIG. 1 and FIG. 2. The processes may be implemented as program code for segment locator 124.

The process begins by displaying a video on a display system (step 500). The process receives user input to the video from a user input device while the video is displayed on the display system (step 502). The user input describes a defined movement path for an object.

The process searches the video for a video segment that includes a movement path for an object that is sufficiently similar to a defined movement path (step 504). The process displays the video segment on the display system (step 506). The process terminates thereafter.

Figure 6:
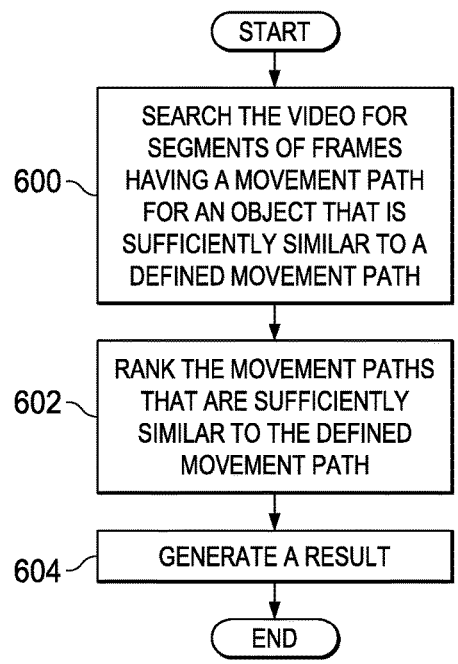
FIG. 6 is a flowchart of a process for generating results from searching a video for a defined movement path in accordance with an illustrative embodiment.

With reference now to FIG. 6, a flowchart of a process for generating results from searching a video for a defined movement path is depicted in accordance with an illustrative embodiment. The process illustrated in FIG. 6 may be implemented in at least one of software or hardware for segment locator 124 as shown in FIG. 1 and FIG. 2. The processes may be implemented as program code for segment locator 124.

The process begins by searching the video for segments of frames having a movement path for an object that is sufficiently similar to a defined movement path (step 600). For example, a movement may be considered to be sufficiently similar to the defined movement path if the movement path does not deviate from the defined path by some threshold. The threshold may be selected any number of ways. For example, the threshold may be selected as a percentage, a value, or some other suitable manner. In some cases, the threshold may be defined using an equation.

The process ranks the movement paths that are sufficiently similar to the defined movement path (step 602). The ranking may be based on how closely each of the movement paths match the defined movement path. The process then generates a result (step 604). The process terminates thereafter.

Figure 7:
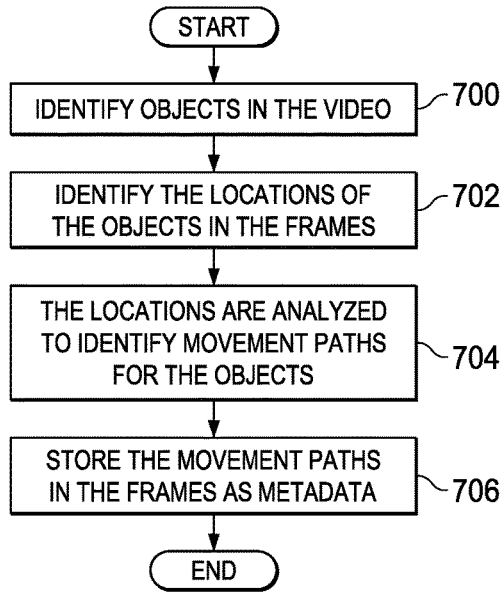
FIG. 7 is a flowchart of a process for generating results from searching a video for a defined movement path in accordance with an illustrative embodiment.

With reference now to FIG. 7, a flowchart of a process for generating results from searching a video for a defined movement path is depicted in accordance with an illustrative embodiment. The process illustrated in FIG. 7 may be implemented in at least one of software or hardware for segment locator 124 as shown in FIG. 1 and FIG. 2. For example, this process may be implemented in tracker 202 in segment locator 124 shown in FIG. 2.

The process begins by identifying objects in the video (step 700). In step 700, each frame in the video may analyzed to detect the presence of objects in the video. Step 700 may be implemented using currently available software for detecting objects. This detection also includes recognizing objects. For example, software may be selected that recognizes objects using image boundary and object recognition techniques.

The process identifies the locations of the objects in the frames (step 702). The locations are then analyzed to identify movement paths for the objects (step 704). Step 704 may be implemented using currently available motion-based object tracking techniques. The process then stores the movement paths in the frames as metadata (step 706). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations, or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
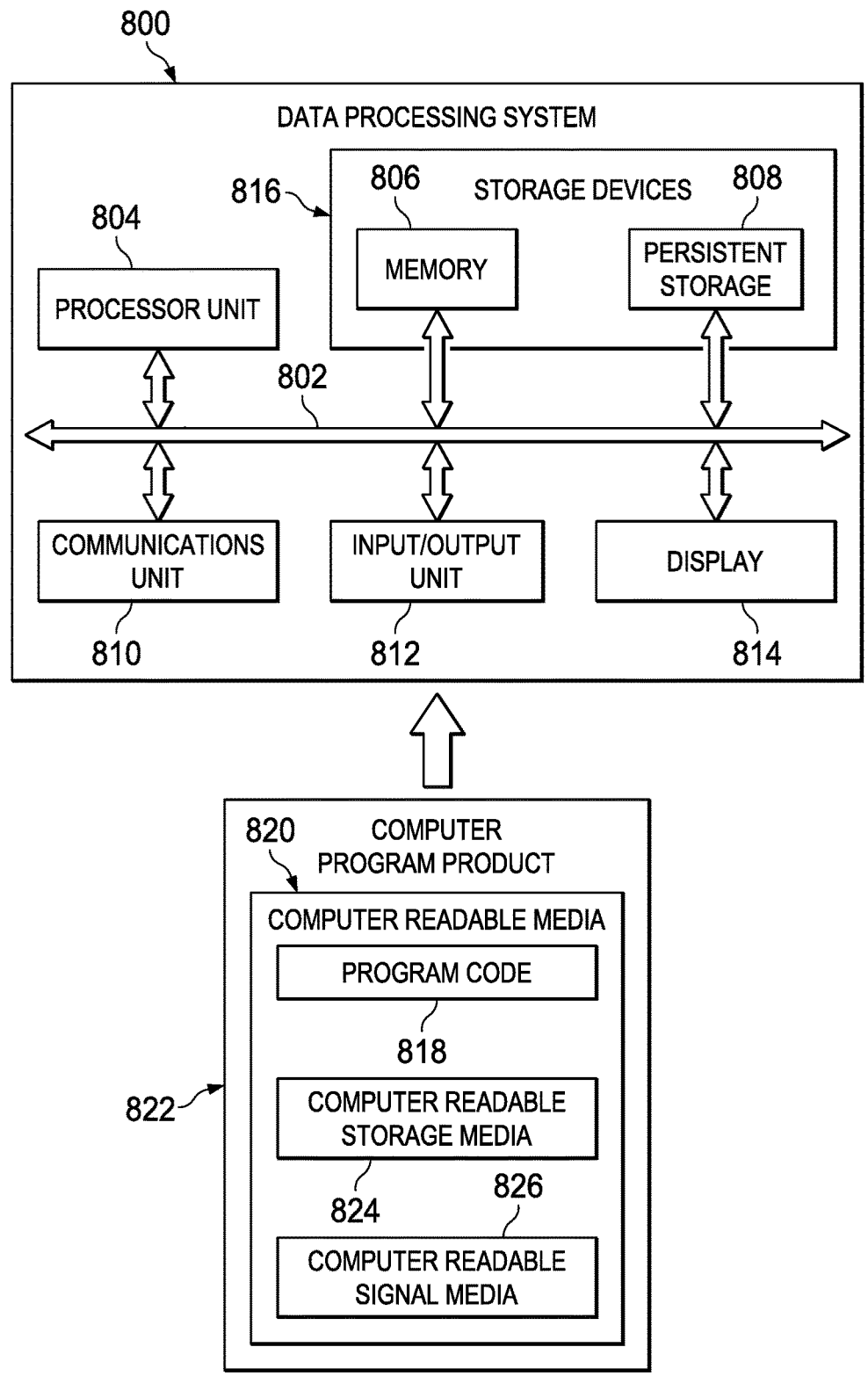
FIG. 8 is a block diagram of a data processing system in accordance with an illustrative embodiment.

Turning now to FIG. 8, a block diagram of a data processing system is depicted in accordance with an illustrative embodiment. Data processing system 800 may be used to implement computer system 104 in FIG. 1. In this illustrative example, data processing system 800 includes communications framework 802, which provides communications between processor unit 804, memory 806, persistent storage 808, communications unit 810, input/output unit 812, and display 814. In this example, communication framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a solid state hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer-usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In one example, computer-readable media 820 may be computer-readable storage media 824 or computer-readable signal media 826.

In these illustrative examples, computer-readable storage media 824 is a physical or tangible storage device used to store program code 818 rather than a medium that propagates or transmits program code 818.

Alternatively, program code 818 may be transferred to data processing system 800 using computer-readable signal media 826. Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

Thus, illustrative embodiments of the present invention provide a computer implemented method, computer system, and computer program product for searching a video. In one illustrative example, a computer system displays the video on a display system. The computer system receives a user input to the video from a user input device while the video is displayed on the display system, wherein the user input describes a defined movement path for an object. The computer system searches the video for a video segment that includes a movement path for the object that is sufficiently similar to the defined movement path and displays the video segment on the display system.

In this manner, a user may be able to search for movements of objects in a video, such that one or more segments of the video can be displayed that have the corresponding movements in which the movement paths sufficiently match the defined movement path input by the user. For example, a user may desire to see a particular maneuver by a race car during in a race. The user may input a movement path for that maneuver. The segment locator in the computer system may locate one or more segments in the video in which a particular racecar or any racecar moves along a path that is sufficiently similar to the defined movement path.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function or functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. A method for searching a video comprising:
    displaying, by a computer system, the video on a display system;
    receiving a user input, by the computer system, to the video from a user input device while the video is displayed on the display system, wherein the user input describes a defined movement path for an object;
    searching, by the computer system, the video for a video segment that includes a movement path for the object that is sufficiently similar to the defined movement path; and
    displaying, by the computer system, the video segment on the display system.

2. The method of claim 1 further comprising:
    identifying objects in frames for the video;
    identifying movement paths for the objects in the frames; and
    storing the movement paths as metadata in the frames.

3. The method of claim 2, wherein searching the video for the video segment that includes the movement path for the object that is sufficiently similar to the defined movement path comprises:
    comparing the defined movement path to the movement paths in the metadata for the movement path in the movement paths that is that is sufficiently similar to the defined movement path.

4. The method of claim 1 further comprising:
    displaying results of searching the video.

5. The method of claim 4, wherein the results are ranked on how closely movement of the object in each segment in the results matches the defined movement path.

6. The method of claim 1, wherein the user input also selects the object.

7. The method of claim 1, wherein the defined movement path in the user input is defined using coordinates for dimensions consisting one of two dimensions and three dimensions.

8. The method of claim 1, wherein the user input is a three-dimensional gesture made to the user input device in the form of a touch screen.

9. The method of claim 1 wherein the user input device is selected from a group consisting of a mouse, a touch screen, a trackball, a cyber glove, or a motion sensing input device.

10. A video processing system comprising
    a processor unit; and
    a segment locator running on the processor unit, wherein the segment locator displays a video on a display system; receives a user input to the video from a user input device, while the video is displayed on the display system, wherein the user input describes a defined movement path for an object; searches the video for a video segment that includes a movement path for the object that is sufficiently similar to the defined movement path; and displays the video segment.

11. The video processing system of claim 10, wherein the segment locator identifies objects in frames for the video; identifies movement paths for the objects in the frames; and stores the movement paths as metadata in the frames.

12. The video processing system of claim 11, wherein in searching the video for the video segment that includes the movement path for the object that is sufficiently similar to the defined movement path, the segment locator compares the defined movement path to the movement paths in the metadata for the movement path in the movement paths that is that is sufficiently similar to the defined movement path.

13. The video processing system of claim 10, wherein the segment locator displays results of searching the video.

14. The video processing system of claim 13, wherein the results are ranked on how closely movement of the object in each segment in the results matches the defined movement path.

15. The video processing system of claim 10, wherein the user input also selects the object.

16. The video processing system of claim 10, wherein the user input is a three-dimensional gesture made to the user input device in the form of a touch screen.

17. A computer program product for searching a video, the computer program product comprising:
    a computer-readable storage media;
    first program code, stored on the computer-readable storage media, for displaying, by a computer system, the video on a display system;
    second program code, stored on the computer-readable storage media, for receiving a user input to the video from a user input device while the video is displayed on the display system, wherein the user input describes a defined movement path for an object;

third program code, stored on the computer-readable storage media, for searching the video for a video segment that includes a movement path for the object that is sufficiently similar to the defined movement path; and fourth program code, stored on the computer-readable storage media, for displaying the video segment.

18. The computer program product of claim 17 further comprising:

fifth program code, stored on the computer-readable storage media, for identifying objects in frames for the video;

sixth program code, stored on the computer-readable storage media, for identifying movement paths for the objects in the frames; and seventh program code, stored on the computer-readable storage media, for storing the movement paths as metadata in the frames.

19. The computer program product of claim 18, wherein the third program code comprises:

program code, stored on the computer-readable storage media, for comparing the defined movement path to the movement paths in the metadata for the movement path in the movement paths that is that is sufficiently similar to the defined movement path.

20. The computer program product of claim 18 further comprising:

eighth program code, stored on the computer-readable storage media, for displaying results of searching the video.

* * * * *